United States Patent
Lee et al.

(10) Patent No.: US 12,159,968 B2
(45) Date of Patent: Dec. 3, 2024

(54) LITHIUM SECONDARY BATTERY WITH AN ANODE HAVING TWO ACTIVE MATERIAL LAYERS

(71) Applicant: SK ON Co., Ltd., Seoul (KR)

(72) Inventors: Yong Seok Lee, Daejeon (KR); Jung Hwan Kim, Daejeon (KR); Sang Won Bae, Daejeon (KR); Ji Hee Bae, Daejeon (KR); Myung Ro Lee, Daejeon (KR); Jae Yun Min, Daejeon (KR)

(73) Assignee: SK On Co., Ltd., Seoul (KR)

( * ) Notice: Subject to any disclaimer, the term of this patent is extended or adjusted under 35 U.S.C. 154(b) by 30 days.

(21) Appl. No.: 17/160,610

(22) Filed: Jan. 28, 2021

(65) Prior Publication Data

US 2021/0234191 A1    Jul. 29, 2021

(30) Foreign Application Priority Data

Jan. 29, 2020    (KR) .................. 10-2020-0010307

(51) Int. Cl.
| | |
|---|---|
| *H01M 10/0525* | (2010.01) |
| *H01M 4/04* | (2006.01) |
| *H01M 4/36* | (2006.01) |
| *H01M 4/38* | (2006.01) |
| *H01M 4/583* | (2010.01) |
| *H01M 50/46* | (2021.01) |

(52) U.S. Cl.
CPC ..... *H01M 10/0525* (2013.01); *H01M 4/0404* (2013.01); *H01M 4/0428* (2013.01); *H01M 4/366* (2013.01); *H01M 4/386* (2013.01); *H01M 4/583* (2013.01); *H01M 50/46* (2021.01)

(58) Field of Classification Search
None
See application file for complete search history.

(56) References Cited

U.S. PATENT DOCUMENTS

| | | | |
|---|---|---|---|
| 2014/0349180 A1* | 11/2014 | Kim | H01M 4/587 429/211 |
| 2019/0139714 A1* | 5/2019 | Shin | H01M 4/366 |
| 2020/0067098 A1 | 2/2020 | Choi et al. | |
| 2020/0220156 A1 | 7/2020 | Shin et al. | |
| 2020/0243848 A1 | 7/2020 | Kim et al. | |
| 2021/0119200 A1* | 4/2021 | Nam | H01M 4/134 |

FOREIGN PATENT DOCUMENTS

| | | |
|---|---|---|
| JP | 201750142 A | 3/2017 |
| JP | 2019501492 A | 1/2019 |
| KR | 101764072 B1 | 8/2017 |
| KR | 1020190042299 A | 4/2019 |
| KR | 1020190064480 A | 6/2019 |
| KR | 1020190065172 A | 6/2019 |
| KR | 1020190074999 A | 6/2019 |

* cited by examiner

*Primary Examiner* — Zhongqing Wei
(74) *Attorney, Agent, or Firm* — The Webb Law Firm

(57) ABSTRACT

Embodiments of the present invention provide a lithium secondary battery including anode active material layers which have a multi-layered structure and include carbon-based active materials having different contents from each other, thereby improving mechanical stability and battery performance.

8 Claims, 2 Drawing Sheets

LITHIUM SECONDARY BATTERY WITH AN ANODE HAVING TWO ACTIVE MATERIAL LAYERS

CROSS-REFERENCE TO RELATED APPLICATION

This application claims priority to Korean Patent Application No. 10-2020-0010307 filed Jan. 29, 2020, the disclosure of which is hereby incorporated by reference in its entirety.

BACKGROUND OF THE INVENTION

1. Field of the Invention

The present invention relates to a lithium secondary battery, and more specifically, to a lithium secondary battery having excellent electrochemical properties.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a notebook computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separation membrane (separator); and an electrolyte in which the electrode assembly is impregnated. The lithium secondary battery may further include, for example, a pouch-shaped sheath in which the electrode assembly and the electrolyte are housed.

Recently, as subjects, to which the lithium secondary battery is applied, are expanded, development for a lithium secondary battery having a higher capacity and output has been proceeded. For example, cathode or anode materials capable of providing higher capacity have been studied. Specifically, in order to maximize performance of the battery, conditions, in which an anode active material should have an electrochemical reaction potential close to lithium metal, a high reaction reversibility with lithium ions, and a high diffusion rate of lithium ions in the active material, etc., are required.

For example, as an alternative material to a conventional anode including a carbon-based material, an anode including a carbon-based material and a silicon-based material, etc. has been studied. However, when the material of the anode is changed, long-term characteristics such as high-temperature storage characteristics and life-span characteristics may be deteriorated due to the changed material of the anode.

For example, Korean Patent Registration No. 10-1764072 discloses a binder for a lithium iron phosphate electrode coated with carbon, but there is a limit to secure sufficient life-span characteristics and stability.

PRIOR ART DOCUMENT

Patent Document

Korean Patent Registration No. 10-1764072

SUMMARY OF THE INVENTION

It is an object of the present invention to provide a lithium secondary battery having improved stability and operational reliability.

A lithium secondary battery according to exemplary embodiments may include: a cathode; a separation membrane; and an anode which faces the cathode with the separation membrane interposed therebetween, and includes an anode current collector, a first anode active material layer and a second anode active material layer which are sequentially stacked from the anode current collector. In this case, the first anode active material layer may include a silicon-based active material and a carbon-based active material, and the second anode active material layer may include a carbon-based active material or a mixture of the carbon-based active material and the silicon-based active material. In addition, when the second anode active material layer may include the mixture, a content of the silicon-based active material in the second anode active material layer may be lower than a content of the silicon-based active material in the first anode active material layer.

In some embodiments, a content of the silicon-based active material in the first anode active material layer may be 2 to 15% by weight based on a weight of the carbon-based active material included in the first anode active material layer.

In some embodiments, a content of the silicon-based active material in the second anode active material layer may be 0.1 to 5% by weight based on a weight of the carbon-based active material included in the second anode active material layer.

In some embodiments, the carbon-based active material may include artificial graphite or natural graphite.

In some embodiments, the carbon-based active material may include artificial graphite and natural graphite, and a weight ratio of the artificial graphite to the natural graphite may be 99:1 to 5:5.

In some embodiments, the carbon-based active material may include artificial graphite and natural graphite, and a weight ratio of the artificial graphite to the natural graphite may be 9:1 to 7:3.

In some embodiments, the silicon-based active material may include at least one selected from the group of silicon (Si), a silicon alloy, a silicon oxide, and a silicon-carbon composite.

In some embodiments, each of the first anode active material layer and the second anode active material layer may further include a binder, and a content of the binder may be 2 to 5% by weight based on a total weight of the first anode active material layer.

In some embodiments, the anode may further include a third anode active material layer formed on the second anode active material layer and including a carbon-based active material.

In some embodiments, the third anode active material layer may further include a silicon-based active material, and a content of the silicon-based active material included in the third anode active material layer may be lower than the content of the silicon-based active material included in the second anode active material layer.

The lithium secondary battery according to embodiments of the present invention may include anode active material layers having a multi-layered structure. According to exemplary embodiments, a content of the silicon-based active material in the anode active material layer adjacent to the anode current collector may be higher than a content of the silicon-based active material in the anode active material layer far away from the anode current collector.

When applying a silicon-based active material to the anode active material, deterioration in high-temperature storage characteristics and life-span characteristics may occur due to expansion and deformation of the electrode by the silicon-based active material, but the lithium secondary battery according to the embodiments of the present invention may improve mechanical and chemical stabilities, as well as secure long-term characteristics.

In exemplary embodiments, each of the anode active material layers may include a carbon-based active material. In this case, the carbon-based active material may include artificial graphite and natural graphite, and when satisfying a weight ratio of 99:1 to 5:5, it is possible to simultaneously improve conductivity and stability, while implementing high-capacity/high-power battery performances.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

Embodiments of the present invention provide a lithium secondary battery including anode active material layers which have a multi-layered structure and include carbon-based active materials having different contents from each other, thereby improving mechanical stability and battery performance.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

Figure 1:
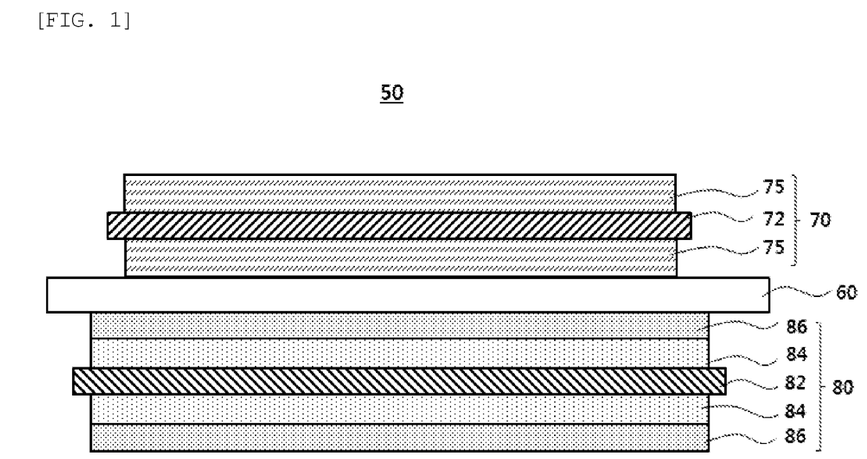
FIG. 1 is a schematic cross-sectional view illustrating an electrode assembly of a lithium secondary battery according to exemplary embodiments.

FIG. 1 is a schematic cross-sectional view illustrating an electrode assembly of a lithium secondary battery according to exemplary embodiments.

Referring to FIG. 1, an electrode assembly 50 may include a cathode 70 and an anode 80 which are disposed to face each other with a separation membrane 60 interposed therebetween.

The cathode 70 may include a cathode current collector 72 and a cathode active material layer 75 formed on a surface of the cathode current collector 72.

The cathode current collector 72 may include, for example, stainless steel, nickel, aluminum, titanium, copper, or an alloy thereof, and preferably, aluminum or an aluminum alloy.

The cathode active material layers 75 may be formed on at least one of upper and lower surfaces of the cathode current collector 72. According to exemplary embodiments, the cathode active material layers 75 may be formed on the upper and lower surfaces of the cathode current collector 72, respectively.

For example, a cathode slurry may be prepared by mixing a cathode active material with a cathode binder, a conductive material, and/or a dispersant in a solvent, and stirring the same. The cathode slurry may be coated on the cathode current collector 72, followed by compressing and drying to manufacture the cathode 70.

The cathode active material may include a compound capable of reversibly intercalating and deintercalating lithium ions.

In exemplary embodiments, the cathode active material may include a lithium transition metal oxide. For example, the lithium transition metal oxide includes nickel (Ni), and may further include at least one of cobalt (Co) and manganese (Mn).

For example, the lithium transition metal oxide may be represented by Formula 1 below.

[Formula 1]

In Formula 1, $\alpha$, x and y may be in a range of $-0.05 \leq \alpha \leq 0.15$, $0.01 \leq x \leq 0.3$, and $0.01 \leq y \leq 0.3$, and M may be at least one element selected from Mn, Mg, Sr, Ba, B, Al, Si, Ti, Zr and W.

The cathode binder may include, for example, an organic binder such as vinylidene fluoride-hexafluoropropylene copolymer (PVDF-co-HFP), polyvinylidene fluoride (PVDF), polyacrylonitrile, polymethyl methacrylate, etc., or at least one aqueous binder such as styrene-butadiene rubber (SBR), and may be used together with a thickener such as carboxymethyl cellulose (CMC).

For example, a PVDF-based binder may be used as the cathode binder. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$, etc.

The anode 80 may include an anode current collector 82 and an anode active material layer formed on a surface of the anode current collector 82. The anode active material layer may be formed on at least one of upper and lower surfaces of the anode current collector 82. According to exemplary embodiments, the anode active material layers may be formed on the upper and lower surfaces of the anode current collector 82, respectively.

The anode current collector 82 may include, for example, gold, stainless steel, nickel, aluminum, titanium, copper or an alloy thereof, and preferably, copper or a copper alloy.

The anode active material layer may have a multi-layered structure. According to exemplary embodiments, the anode active material layer may include a first anode active material layer 84 and a second anode active material layer 86 which are sequentially stacked from the surface of the anode current collector 82.

The first anode active material layer 84 may contact with the surface of the anode current collector 82. The first anode active material layer 84 may include a carbon-based active material and a silicon-based active material.

The second anode active material layer 86 may be formed on the first anode active material layer 84. The second anode active material layer 86 may include a carbon-based active material or a mixture of the carbon-based active material and the silicon-based active material. For example, the second anode active material layer 86 may include only the carbon-based active material such artificial as graphite and natural graphite, etc. as the anode active material without including the silicon-based active material, and may also include both of the silicon-based active material and the carbon-based active material.

When the anode active materials included in each of the first anode active material layer 84 and the second anode active material layer 86 are the carbon-based active material and the silicon-based active material, the same material as or different materials from each other may be used.

According to exemplary embodiments, the carbon-based active material may include at least one selected from the group of artificial graphite, natural graphite, hard carbon, soft carbon, cokes, carbon black, and fibrous carbon.

For example, artificial graphite, or a mixture of natural graphite and artificial graphite may be used. The artificial graphite is relatively superior to the natural graphite in terms of life-span characteristics, and thereby, it is possible to prevent degradation in electrode life-span and stability of the lithium secondary battery.

In one embodiment, when the carbon-based active material includes artificial graphite and natural graphite together, a weight ratio of the artificial graphite to the natural graphite may be 99:1 to 5:5, and preferably, 9:1 to 7:3. Within the above range, it is possible to secure additional capacity/output improvement through the natural graphite while improving mechanical stability of the anode or secondary battery through the artificial graphite.

When using a silicon-based active material such as silicon as the anode active material, the battery capacity is increased, whereas a deformation of the anode may occur due to repeated charging and discharging. In this case, by including a large amount of artificial graphite having a relatively higher stability than the natural graphite, it is possible to more improve the mechanical stability of the lithium secondary battery.

According to exemplary embodiments, the silicon-based active material may include at least one selected from the group of silicon (Si), silicon alloy, silicon oxide, silicon-carbon (Si—C) composite, and silicon alloy-based-carbon composite.

Conventionally, the carbon-based active material has been mainly used as the anode active material, and in the case of the carbon-based active material, a theoretical capacity may be limited to a level of about 370 mAh/g. According to exemplary embodiments, when using the silicon-based active material together by mixing, it is possible to significantly improve the output and capacity characteristics of the secondary battery beyond the theoretical capacity limit of the carbon-based active material.

In some embodiments, a mixture or blend of the silicon-based active material and the carbon-based active material may include a silicon-carbon composite. The silicon-carbon composite may include, for example, silicon carbide (SiC), or silicon-carbon particles having a core-shell structure. The silicon-carbon particles may be formed by depositing a silicon layer on a surface of the graphite core, for example. In one embodiment, the silicon-carbon particles may be formed by coating a silicon layer on the commercially used graphite particles through a chemical vapor deposition (CVD) process using a silicon precursor compound such as a silane-based compound. As the carbon-based active material is used together, it is possible to buffer excessive expansion of the electrode by the silicon-based active material, which occurs during repeated charging and discharging.

In exemplary embodiments, the second anode active material layer 86 may have a lower content of the silicon-based active material than that of the first anode active material layer 84. Accordingly, by reducing the content of the silicon-based active material in the anode active material layer which is largely exposed to an electrolyte, chemical and mechanical stabilities of the anode may be improved, and long-term life-span characteristics and high-temperature storage characteristics of the lithium secondary battery may be enhanced.

In one embodiment, the content of the silicon-based active material in the first anode active material layer 84 may be 2 to 15% by weight ('wt. %') based on the weight of the carbon-based active material included in the first anode active material layer 84, and preferably, 7 to 12 wt. %. If the content of the silicon-based active material is less than about 2 wt. %, the effect of increasing the capacity/output through the silicon-based active material may not be sufficiently implemented. If the content of the silicon-based active material exceeds about 15 wt. %, the effect of improving the stability of the anode through the anode active material layer having the multi-layered structure may not be implemented.

In one embodiment, when the second anode active material layer 86 includes a mixture of the carbon-based active material and the silicon-based active material, of the silicon-based active material in the second anode active material layer 86 may be lower than the content of the silicon-based active material included in the first anode active material layer 84. For example, the content of the silicon-based active material in the second anode active material layer 86 may be 0.5 to 5 wt. % based on the weight of the carbon-based active material included in the second anode active material layer 86. Within this range, it is possible to increase the energy density of the lithium secondary battery due to an increase in average discharge potential while also improving the high-temperature storage performance of the anode.

As a method of manufacturing the first anode active material layer 84 and the second anode active material layer 86, any method known in the art may be used. For example, the anode active material layer may be manufactured using a method of preparing an anode slurry by mixing an anode active material, a binder, a conductive material, and/or a dispersant in a solvent, and coating the prepared anode slurry on the anode current collector 82 or the first anode active material layer 84, then performing drying and rolling processes.

As the solvent, a non-aqueous solvent may be used. As the non-aqueous solvent, for example, N-methyl-2-pyrrolidone (NMP), dimethylformamide, dimethylacetamide, N, N-dimethylaminopropylamine, ethylene oxide, tetrahydrofuran, etc. may be used, but it is not limited thereto.

In addition to the above-described carbon-based active material and silicon-based active material, the anode active material may include metal further complex oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements belonging to groups 1, 2, and 3 of the periodic table, halogen; $0<x \leq 1$; $1 \leq y \leq 3$; $1 \leq z \leq 8$; etc.; lithium metal; a lithium alloy; a tin-based alloy; metal oxides such as Sno, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, etc.; conductive polymers such as polyacetylene; Li—Co—Ni-based material; titanium oxide; lithium titanium oxide, and the like, but it is not limited thereto.

As the binder, any material used in the art may be used without particular limitation thereof, and for example, an organic binder such as vinylidene fluoride-hexafluoropropylene copolymer (PVDF-co-HFP), polyvinylidene fluoride (PVDF), polyacrylonitrile, polymethyl methacrylate, etc., or at least one aqueous binder such as styrene-butadiene rubber (SBR) may be used together with a thickener such as carboxymethyl cellulose (CMC).

In some embodiments, the binder may include an acrylic binder. The acrylic binder may have a relatively high tensile strength (modulus) and may suppress expansion/contraction of the silicon-based active material, thereby preventing decomposition and collapse of the active material. Therefore, even when repeated charging/discharging, it is possible to stably maintain the capacity and output of the secondary battery for a long period time. For example, the acrylic binder may be blended with polyvinyl alcohol (PVA) and used together. Accordingly, it is possible to prevent excessive expansion of the silicon-based active material while blocking irreversible decomposition of the electrolyte.

The content of the binder may be set to an amount required to form an electrode, and may be 5 wt. % or less based on a total weight of the first anode active material layer 84 without particular limitation thereof, in order to improve resistance characteristics in the electrode. Meanwhile, a lower limit of the binder content is not particularly limited, but may be provided to a level capable of maintaining the function of the electrode, and may be, for example, 1 wt. %, and preferably 2 wt. % or more based on the total weight of the first anode active material layer 84.

In some embodiments, the content of the binder may be higher in the anode active material layer having a high content of silicon-based active material among the anode active material layers having a multi-layered structure. For example, the content of the binder in the first anode active material layer 84 may be higher than the content of the binder in the second anode active material layer 86. In this case, it is possible to more effectively suppress the deformation of the anode with respect to the silicon-based active material having high expansion/contraction characteristics when charging and discharging.

As the conductive material, a conventional conductive carbon material may be used without particular limitation thereof. For example, carbon-based conductive materials such as carbon black, graphene, carbon nanotubes; and/or metal-based conductive materials including perovskite materials such as tin, tin oxide, titanium oxide, $LaSrCoO_3$, and $LaSrMnO_3$ may be used.

In some embodiments, the content of the anode active material may be about 90 to 98 wt. %, the content of the anode binder may be about 1 to 5 wt. %, and the content of the conductive material may be about 0.5 to 5 wt. % based on the total weight of the solid content of the anode slurry.

The anode slurry forming the second anode active material layer 86 may also include a conductive material and/or a dispersant substantially the same as or similar to the above-described anode slurry forming the first anode active material layer.

As described above, by using the silicon-based active material in the anode active material layers 84 and 86 together, the output and capacity of the secondary battery may be increased. In addition, by including a relatively small amount of the silicon-based active material in the second anode active material layer 86, side reactions with the electrolyte may be suppressed, and repetition of expansion and contraction occurring when charging/discharging of the silicon-based active material may be reduced.

Further, by adjusting the contents of the carbon-based active material and the silicon-based active material in the first anode active material layer 84 and the second anode active material layer 86, damage and defects of the anode 80 due to expansion and contraction of the electrode may be suppressed, while securing overall adhesion of the anode active material layer. In this case, expansion of the silicon-based active material may be more effectively suppressed by surrounding or covering an outer surface of the anode active material layer according to the content of the binder.

The separation membrane 60 may include a porous polymer film made of a polyolefin polymer such as ethylene homopolymer, propylene homopolymer, ethylene/butene copolymer, ethylene/hexene copolymer, ethylene/methacrylate copolymer. The separation membrane 60 may include a nonwoven fabric made of glass fiber having a high melting point, polyethylene terephthalate fiber or the like.

In some embodiments, the anode 80 may have an area and/or volume (e.g., a contact area with the separation membrane 60) larger than those/that of the cathode 70. Thereby, lithium ions generated from the cathode 70 may smoothly move to the anode 80 without being precipitated in the middle, for example. Therefore, effects of improving the capacity and output by using the above-described silicon-based active material may be more easily implemented.

Figure 2:
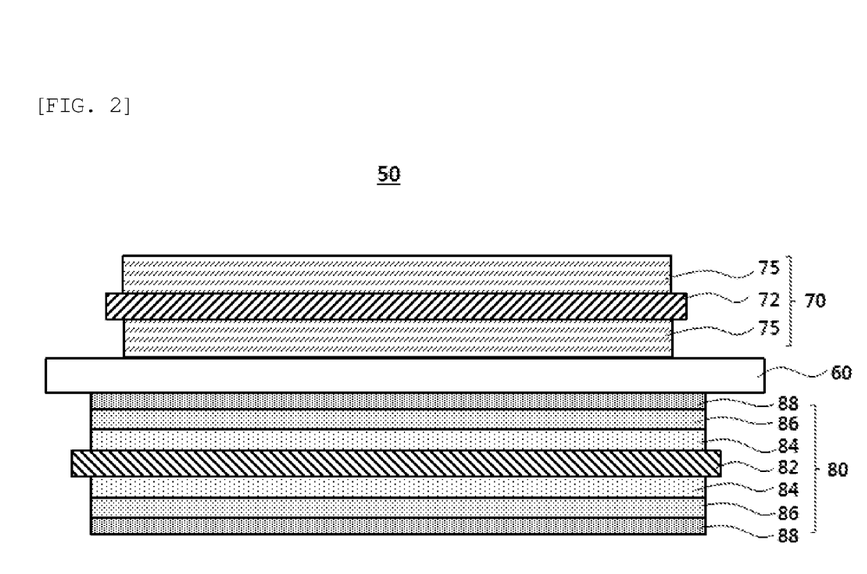
FIG. 2 is a schematic cross-sectional view illustrating an electrode assembly of a lithium secondary battery according to some exemplary embodiments.

FIG. 2 is a schematic cross-sectional view illustrating an electrode assembly of a lithium secondary battery according to some exemplary embodiments. The configurations and structures that are substantially the same as or similar to those described with reference to FIG. 1 will not be described in detail.

Referring to FIG. 2, the anode 80 may further include a third anode active material layer 88 formed on the second anode active material layer 86.

The third anode active material layer 88 includes a carbon-based active material, and may further include a silicon-based active material. For example, the third anode active material layer 88 may include only the carbon-based active material such as artificial graphite and natural graphite, etc. as the anode active material without including the silicon-based active material, and may also include both of the silicon-based active material and the carbon-based active material. When the anode active material included in each of the first anode active material layer 84 to the third anode active material layer 88 is the carbon-based active material and the silicon-based active material, the same material as or different materials from each other may be used.

In exemplary embodiments, the third anode active material layer 88 may have a lower content of the silicon-based active material than that of the second anode active material layer 86. Accordingly, by reducing the silicon-based content in the anode active material layer which is largely exposed to an electrolyte, chemical and mechanical stabilities of the anode may be improved, and long-term life-span characteristics and high-temperature storage characteristics of the lithium secondary battery may be enhanced.

In some embodiments, the anode 80 may include two or more anode active material layers sequentially applied to the anode current collector 82, and preferably, the anode active material layers are formed in 2 to 5 layers. In this case, among the adjacent anode active material layers, an anode active material layer located relatively close to the anode current collector 82 may have a lower content of the carbon-based material and a higher content of the silicon-based material.

Therefore, the content of the silicon-based active material in the anode active material layer adjacent to the electrolyte may be 0 to 5 wt. % based on the content of the carbon-based active material included in the anode active material layer, and excessive expansion of the silicon-based active material may be suppressed, while blocking irreversible decomposition of the electrolyte.

In addition, by forming the anode 80 in such a way that the content of the silicon-based active material in the anode active material layer adjacent to the anode current collector 82 is higher than the content of the silicon-based active material in the anode active material layer located far away from the anode current collector 82, even when the silicon-based active material expands, exfoliation, peeling-off, cracks, voids, etc. in the entire anode active material layer may be prevented, and mechanical stability and long-term life-span characteristics of the lithium secondary battery may be improved.

Figure 3:
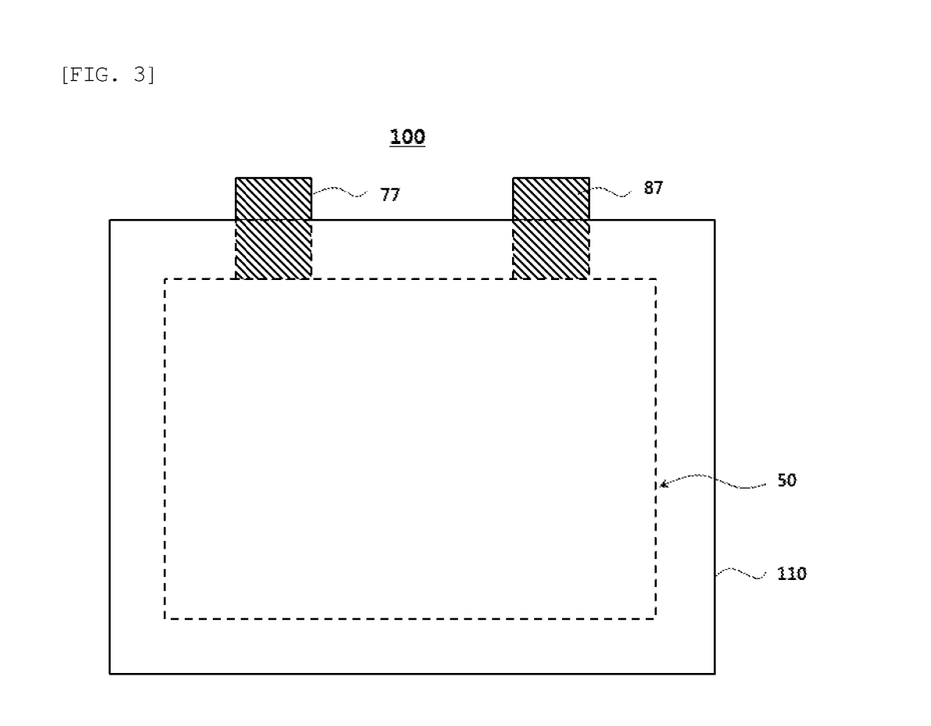
FIG. 3 is a schematic plan view illustrating a lithium secondary battery according to exemplary embodiments.

FIG. 3 is a schematic plan view illustrating a lithium secondary battery according to exemplary embodiments.

Referring to FIG. 3, a lithium secondary battery 100 is housed in an outer case 110, and may include the electrode assembly 50 described with reference FIGS. 1 and 2.

In FIGS. 1 and 2, only one cathode 70 and one anode 80 are shown on the upper and lower surfaces of the separation membrane 60, respectively, for the convenience of description, but a plurality of unit cells defined as the cathode 70-separation membrane 60-anode 80 are repeatedly stacked to define the electrode assemblies 50. For example, the electrode assemblies 50 may be formed through winding, lamination, folding, or the like of the separation membrane 60.

The electrode assembly 50 may be housed together with an electrolyte in the outer case 110 to define a lithium secondary battery. According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion (X—) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, Y-butyrolactone, propylene sulfite, tetrahydrofurane, and the like may be used. These compounds may be used alone or in combination of two or more thereof.

As shown in FIG. FIG. 3, electrode tabs (a cathode tab and an anode tab) protrude from the cathode current collector 72 and the anode current collector 82, respectively, which belong to each unit cell, and may extend to one side of the outer case 110. The electrode tabs may be fused together with the one side of the outer case 110 to form electrode leads (a cathode lead 77 and an anode lead 87) extending or exposed to an outside of the outer case 110.

In FIG. 3, the cathode lead 77 and the anode lead 87 are shown to protrude from an upper side of the outer case 110 in a planar direction, but positions of these electrode leads are not limited thereto. For example, the electrode leads may protrude from at least one of both sides of the outer case 110 or may protrude from a lower side of the outer case 110. Alternatively, the cathode lead 77 and the anode lead 87 may be formed to protrude from different sides of the outer case 110, respectively.

The lithium secondary battery may be manufactured, for example, in a cylindrical shape using a can, a square shape, a pouch shape or a coin shape.

Hereinafter, preferred examples are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Example 1

A slurry was prepared by mixing Li $[Ni_{0.88}Co_{0.1}Mn_{0.02}]O_2$ as a cathode active material, carbon black as a conductive material, and polyvinylidene fluoride (PVdF) as a binder in a weight ratio of 96.5:2:1.5. The prepared slurry was uniformly applied to an aluminum foil having a thickness of 12 µm, and is vacuum-dried at 130° C. to prepare a cathode for a lithium secondary battery.

A first anode slurry including 100 parts by weight of graphite, 12 parts by weight of silicon oxide (SiOx), 2.5 parts by weight of SBR/CMC binder, and 0.5 parts by weight of CNT as a conductive material was prepared. The prepared first anode slurry was uniformly coated on a copper foil having a thickness of 8 µm.

A second anode slurry including 100 parts by weight of graphite, 2 parts by weight of SBR/CMC binder, and 0.5 parts by weight of CNT as a conductive material was prepared. The prepared second anode slurry was applied to the coated first anode slurry.

After applying the first and second anode slurries, an anode including the first anode active material layer (electrode density: 1.73 g/cc) and the second anode active material layer (electrode density: 1.73 g/cc) was prepared through vacuum drying and pressing processes at 130° C.

After the cathode and anode prepared as described above were respectively notched in a predetermined size and stacked, then an electrode cell was fabricated between the cathode and the anode with a separator (polyethylene, thickness: 25 µm) interposed therebetween. Thereafter, tap parts of the cathode and the anode were welded, respectively. An assembly of the welded cathode/separator/anode was put into a pouch, followed by sealing three sides of the pouch except for one side into which an electrolyte is injected. At this time, a portion having the electrode tab was included in the sealing part. After injecting the electrolytic through the remaining one side except for the sealing part, the remaining one side was also sealed, followed by impregnation for 12 hours or more.

The electrolyte used herein was prepared by dissolving 1M $LiPF_6$ solution in a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato) borate (LiBOB) thereto.

Example 2

A lithium secondary battery was manufactured according to the same procedures as described in Example 1, except that 100 pats by weight of graphite and 10.5 parts by weight of silicon oxide (SiOx) were used as an anode active material of the first anode slurry, and 100 parts by weight of graphite and 1.5 parts by weight of silicon oxide (SiOx) were used as an anode active material of the second anode slurry.

Example 3

A lithium secondary battery was manufactured according to the same procedures as described in Example 1, except that 100 parts by weight of graphite and 9 parts by weight of silicon oxide (SiOx) were used as an anode active material of the first anode slurry, and 100 parts by weight of graphite and 3 parts by weight of silicon oxide (SiOx) were used as an anode active material of the second anode slurry.

Example 4

A lithium secondary battery was manufactured according to the same procedures as described in Example 1, except that 100 parts by weight of graphite and 7.5 parts by weight of silicon oxide (SiOx) were used as an anode active material of the first anode slurry, and 100 parts by weight of graphite and 4.5 parts by weight of silicon oxide (SiOx) were used as an anode active material of the second anode slurry.

Example 5

A lithium secondary battery was manufactured according to the same procedures as described in Example 1, except that 100 parts by weight of graphite and 20 parts by weight of silicon oxide (SiOx) were used as an anode active material of the first anode slurry, and 100 parts by weight of graphite and 4.5 parts by weight of silicon oxide (SiOx) were used as an anode active material of the second anode slurry.

Example 6

A lithium secondary battery was manufactured according to the same procedures as described in Example 1, except that 100 parts by weight of graphite and 15 parts by weight of silicon oxide (SiOx) were used as an anode active material of the first anode slurry, and 100 parts by weight of graphite and 8 parts by weight of silicon oxide (SiOx) were used as an anode active material of the second anode slurry.

Example 7

A lithium secondary battery was manufactured according to the same procedures as described in Example 1, except that 100 parts by weight of graphite and 5 parts by weight of silicon oxide (SiOx) were used as an anode active material of the first anode slurry, and 100 parts by weight of graphite and 4 parts by weight of silicon oxide (SiOx) were used as an anode active material of the second anode slurry.

Comparative Example 1

A lithium secondary battery was manufactured according to the same procedures as described in Example 1, except that an anode slurry including 100 parts by weight of graphite, 6 parts by weight of silicon oxide (SiOx), 2.5 parts by weight of SBR/CMC binder, and 0.5 parts by weight of CNT as a conductive material was used to form a single-layered anode active material layer.

Comparative Example 2

A lithium secondary battery was manufactured according to the same procedures as described in Example 1, except that 100 parts by weight of graphite was used as an anode active material of the first anode slurry, and 100 parts by weight of graphite and 11 parts by weight of silicon oxide (SiOx) were used as an anode active material of the second anode slurry.

Comparative Example 3

A lithium secondary battery was manufactured according to the same procedures as described in Example 1, except that 100 parts by weight of graphite and 10 parts by weight of silicon oxide (SiOx) were used as an anode active material of the first anode slurry, and 100 parts by weight of graphite and 15 parts by weight of silicon oxide (SiOx) were used as an anode active material of the second anode slurry.

Experimental Example

1. Measurement of Anode Resistance

For each of the anodes prepared in the above examples and comparative examples, an interface resistance between the anode current collector (copper substrate) and the anode active material layer was measured under the following measurement conditions.
  i) Measurement equipment: Hioki XF057 Probe unit
  ii) Measurement conditions: Current: 100 uA/voltage range: 0.5V
  iii) Number of pin contacts: 500
Results thereof are shown in Table 1 below.

2. Evaluation of Anode Adhesion

For each of the anodes prepared in the above examples and comparative examples, adhesion was measured using an adhesion measurement equipment (IMADA Z Link 3.1). Specifically, an adhesive force was evaluated by measuring a force when peeling-off a surface of the anode at an angle of 90 degrees after attaching the same to a tape. Results thereof are shown in Table 1 below.

3. Evaluation of Life-Span Characteristics

Discharge capacities of the secondary batteries prepared in the examples and the comparative examples were measured at 30 times after repeatedly charging (CC-CV 1.0 C 4.2 V 0.05 C CUT-OFF) and discharging (CC ⅓ C 2.5 V CUT-OFF) 30 times in a battery charger and discharger. In addition, an average discharge potential of the anodes prepared in the examples and the comparative examples was measured. Results thereof are shown in Table 1 below.

4. Evaluation of High-Temperature Storage Characteristics

The secondary batteries prepared in the examples and the comparative examples were charged (CC-CV 1.0 C 4.2 V 0.05 C CUT-OFF), stored in a chamber at 60° C. for two weeks, and then discharge potentials were measured to evaluate high-temperature storage characteristics. Results thereof are shown in Table 1 below.

TABLE 1

| Section | Anode structure | $SiO_x$ wt. % | Adhesive force (N) | Life-span % (30 cycles) | Average discharge potential (V) | High temperature storage (%) |
|---|---|---|---|---|---|---|
| Example 1 | First active material layer | 12 | 0.5 | 95 | 3.62 | 92.5 |
| | Second active material layer | 0 | | | | |
| Example 2 | First active material layer | 10.5 | 0.49 | 98 | 3.61 | 92.0 |
| | Second active material layer | 1.5 | | | | |
| Example 3 | First active material layer | 9 | 0.46 | 98 | 3.61 | 91.5 |
| | Second active material layer | 3 | | | | |
| Example 4 | First active material layer | 7.5 | 0.46 | 96 | 3.60 | 91.0 |
| | Second active material layer | 4.5 | | | | |
| Example 5 | First active material layer | 20 | 0.35 | 93 | 3.57 | 91.0 |
| | Second active material layer | 4.5 | | | | |
| Example 6 | First active material layer | 15 | 0.38 | 95 | 3.59 | 89.2 |
| | Second active material layer | 8 | | | | |
| Example 7 | First active material layer | 5 | 0.5 | 99 | 3.63 | 91.0 |
| | Second active material layer | 4 | | | | |
| Comparative Example 1 | Single layer | 6 | 0.45 | 96 | 3.60 | 90.0 |
| Comparative Example 2 | First active material layer | 0 | 0.42 | 94 | 3.58 | 83 |
| | Second active material layer | 11 | | | | |
| Comparative Example 3 | First active material layer | 10 | 0.40 | 90 | 3.56 | 80 |
| | Second active material layer | 15 | | | | |

Referring to Table 1, the secondary batteries prepared in the examples, which include anode active material layers having a multi-layered structure and have a higher content of silicon-based active material as the anode active material layer closer to the anode current collector, generally exhibited improved adhesion and electrical performance thereof compared to the secondary batteries prepared in the comparative examples.

DESCRIPTION OF REFERENCE NUMERALS

50: Electrode assembly
60: Separation membrane
70: Cathode
72: Cathode current collector
75: Cathode active material layer
80: Anode
82: Anode current collector
84: First anode active material layer
86: Second anode active material layer
88: Third anode active material layer
77: Cathode lead
87: Anode lead
110: Outer case

What is claimed is:

1. A lithium secondary battery comprising:
a cathode;
a separation membrane; and
an anode which faces the cathode with the separation membrane interposed therebetween, and comprises an anode current collector, a first anode active material layer and a second anode active material layer which are sequentially stacked from the anode current collector,
wherein the first anode active material layer includes a mixture of a carbon-based active material and silicon oxide ($SiO_x$), and the second anode active material layer includes a mixture of a carbon-based active material and the silicon oxide ($SiO_x$),
a content of the silicon oxide ($SiO_x$) in the first anode active material layer is 2% to 15% by weight based on a weight of the carbon-based active material included in the first anode active material layer,
a content of the silicon oxide ($SiO_x$) in the second anode active material layer is lower than a content of silicon oxide ($SiO_x$) in the first anode active material layer, and a content of the silicon oxide ($SiO_x$) in the second anode active material layer is 0.1% to 5% by weight based on a weight of the carbon-based active material included in the second anode active material layer.

2. The lithium secondary battery according to claim 1, wherein the carbon-based active material includes artificial graphite or natural graphite.

3. The lithium secondary battery according to claim 1, wherein the carbon-based active material includes artificial graphite and natural graphite, and a weight ratio of the artificial graphite to the natural graphite is 99:1 to 5:5.

4. The lithium secondary battery according to claim 1, wherein the carbon-based active material includes artificial graphite and natural graphite, and a weight ratio of the artificial graphite to the natural graphite is 9:1 to 7:3.

5. The lithium secondary battery according to claim 1, wherein the first anode active material layer or the second anode active material layer includes at least one selected from the group of silicon (Si), a silicon alloy, a silicon oxide, and a silicon-carbon composite.

6. The lithium secondary battery according to claim 1, wherein each of the first anode active material layer and the second anode active material layer further includes a binder, and a content of the binder in the first anode active material layer is higher than the content of the binder in the second anode active material layer.

7. The lithium secondary battery according to claim 1, wherein the anode further comprises a third anode active material layer formed on the second anode active material layer and including a carbon-based active material.

8. The lithium secondary battery according to claim 7, wherein the third anode active material layer further comprises a silicon-based active material, and a content of the silicon-based active material included in the third anode active material layer is lower than the content of the silicon oxide ($SiO_x$) included in the second anode active material layer.

* * * * *